United States Patent [19]

Comroe et al.

[11] Patent Number: 5,095,529

[45] Date of Patent: Mar. 10, 1992

[54] INTERSYSTEM GROUP CALL COMMUNICATION SYSTEM AND METHOD

[75] Inventors: Richard A. Comroe, Dundee; Arun Sobti, Wheaton, both of Ill.

[73] Assignee: Motorola, Inc., Schaumburg, Ill.

[21] Appl. No.: 358,747

[22] Filed: May 30, 1989

[51] Int. Cl.⁵ .................. H04B 7/14; H04M 11/00
[52] U.S. Cl. ............................ 455/16; 455/17; 455/20; 455/34; 455/56; 379/60
[58] Field of Search .................. 455/15-17, 455/31, 20, 33-34, 54, 56; 379/59-61; 370/95.3

[56] References Cited

U.S. PATENT DOCUMENTS

| | | | |
|---|---|---|---|
| 4,233,473 | 11/1980 | Frost | 455/31 |
| 4,578,815 | 3/1986 | Persinotti | 455/17 |
| 4,718,108 | 1/1988 | Davidson et al. | 455/17 |
| 4,775,999 | 10/1988 | Williams | 379/59 |
| 4,833,701 | 5/1989 | Comroe et al. | 455/33 |

Primary Examiner—Reinhard J. Eisenzopf
Assistant Examiner—Andrew Faile
Attorney, Agent, or Firm—Steven G. Parmelee

[57] ABSTRACT

Communication systems having dedicated communication resources are provided with receivers that monitor the communication resources of other communication systems, and roamers are preregistered in non-home systems. Using this infrastructure, a group call can be sourced in one system and relayed to roamers located in other systems.

2 Claims, 1 Drawing Sheet

INTERSYSTEM GROUP CALL COMMUNICATION SYSTEM AND METHOD

Technical Field

This invention relates generally to communication systems, and more particularly to interlinked trunked communication systems.

BACKGROUND ART

Trunked communication systems are known in the art. In general such systems include a resource controller (which may be centrally located or distributed) that manages communications between communication units (such as fixed location, mobile, and portable two-way radios) on a plurality of communication resources (such as frequency pairs or TDM time slots) that are supported by a plurality of corresponding repeaters.

A number of such systems are available, including the Smartnet and Privacy Plus systems from Motorola, the Clearchannel LTR system from E. F. Johnson, and the Sixteen Plus and Sweet Sixteen systems from General Electric.

In general, such systems tend to operate independent of one another. Therefore, a communication unit located in a first system will generally not be able to communicate with a second communication unit located in a second communication system.

Some prior art systems interlink one or more communication systems through use of an appropriate dedicated landline. So configured, communication units in different communication systems may be able to communicate with one another. Such an approach, however, poses several disadvantages, including increased cost and relative inflexibility. In addition, even when so linked, such solutions do not readily accommodate group calls.

A need exists for a system and method for economically and flexibly interlinking two or more communication systems to allow group calls.

SUMMARY OF THE INVENTION

This need is substantially met through provision of the intersystem group call communication system and method disclosed herein. This system functions in conjunction with at least two communication systems that each include a set of communication resources and resource controllers for controlling allocation of these resources. Pursuant to this invention, at least one communication system is also provided with at least one supplemental receiver that is at least substantially compatible with the communication resources that are ordinarily used in the opposing system. So configured, communication requests sourced from a first system can be received by the a second system having such a supplemental receiver tuned to the appropriate resources of the first system, and thereafter be properly processed.

In one embodiment, communication units that belong to a common fleet or group share, at least in part, a common group ID in each system. For example, a first ID is used while communicating within the home system. The home system recognizes this ID as representing a local group or fleet. A second ID can also be used by the radios that comprise the group or fleet when in a second system. This second ID is preregistered in the second system as a roaming ID, along with information regarding the home system that corresponds to that particular ID. In a similar manner, additional IDs can be used with different systems for which the radios are preregistered as roamers.

When such a non-home system determines that a preregistered roamer has entered its system, the non-home system will use its supplemental receiver to monitor the communication resources of the home system for that roamer. Communications from the home system that are intended for the roamer can then be intercepted and forwarded on to the roamer through use of the non-home system resources.

BEST MODE FOR CARRYING OUT THE INVENTION

Figure 1:
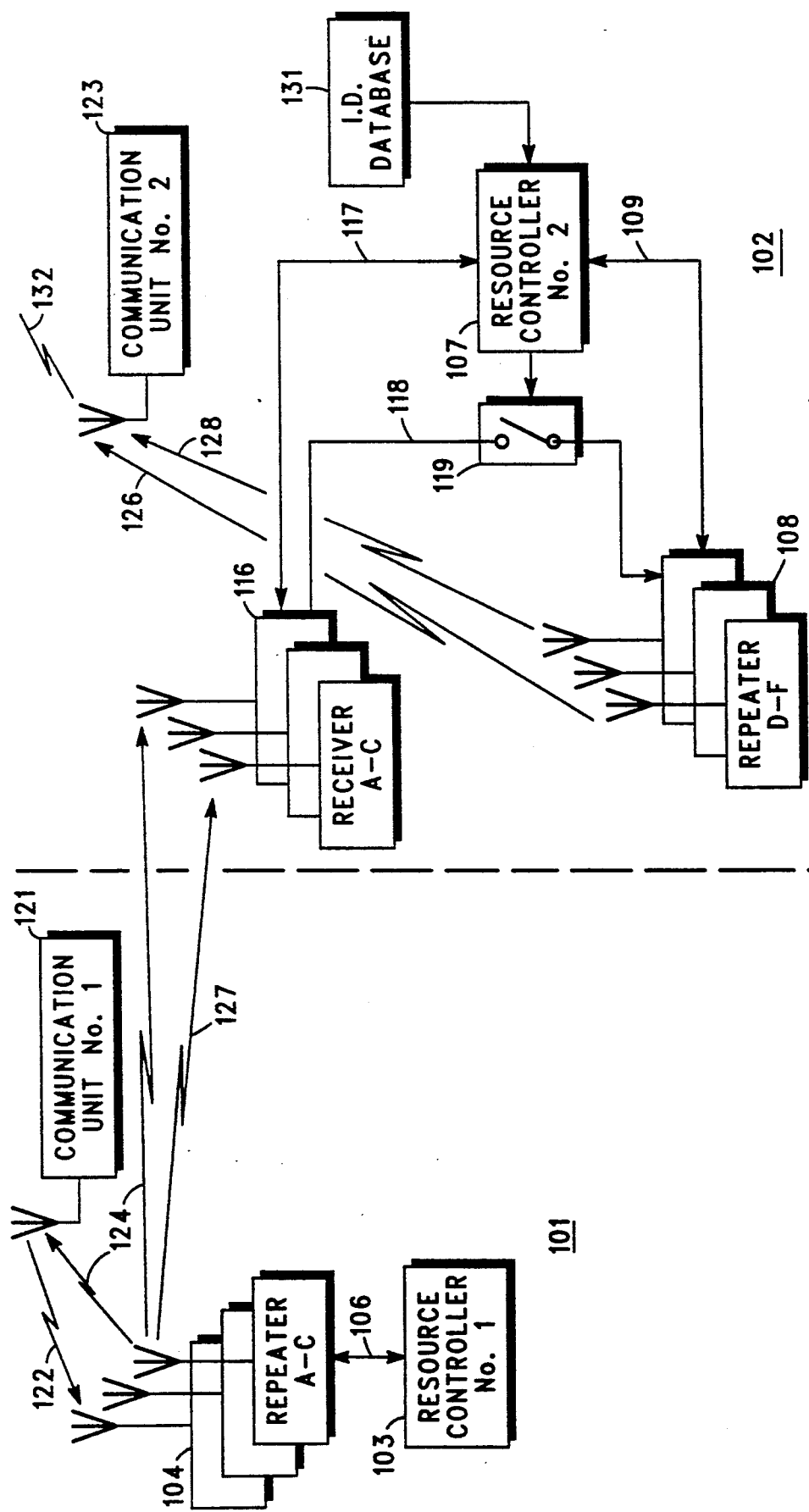
FIG. 1 comprises a block diagram depiction of the invention.

In FIG. 1, the invention can be seen as depicted generally by the numeral 100. The system (100) operates in conjunction with other communication systems. For purposes of this description, only two such communication systems (101 and 102) will be described.

The first communication system (101) comprises a home system and includes a resource controller (103) that functions to control allocation of a first set of communication resources for benefit of a plurality of member communication units. In this embodiment, it will be presumed that the communication resources are supported by a plurality of repeaters (104), and that the communication resources themselves comprise a first set of frequency pairs A-C. In addition, for purposes of this description, it will be presumed that one of the repeaters (104) supports system control information related to resource allocation requests and grants, all as well understood in the art. The resource controller (103) controls the repeaters (104) and interchanges resource allocation request and grant information through the repeaters (104), via an appropriate link (106).

The second communication system (102) similarly includes a resource controller (107), repeaters (108) (which support communication resources D-F) and an appropriate link (109) therebetween. In this embodiment, the communication resources A-C of the first system (101) are different from the communication resources D-F of the second system (102). Therefore, the two systems (101 and 102) are not able to communicate directly with one another through the repeaters provided.

The second communication system (102) also includes a plurality of receivers (116) that are capable of compatibly receiving the communication resources A-C of the home communication system (106). Although it would not necessarily be required that a receiver (116) be provided to accommodate each communication resource of the opposite system, in this embodiment such a receiver (116) has been so provided. An appropriate communication link (117) is provided between the receivers (116) and the resource controller (107) to allow operation of the receivers (116) to be controlled, at least in part, by the resource controller (107), and also to allow the resource controller (107) to receive signalling information as received by the receivers (116) and as sourced from the resource controller (103) of the home system (101). In addition, an appropriate link (118) is provided between the receivers (116) and the repeaters (108) of the second system (102). This link (118) is appropriately gated (119) to allow the resource controller (107) to control provision of signals received by the receivers (116) to the repeaters (108).

So configured, the resource controller (107) can cause a particular repeater (108) to retransmit a communication, such as a voice message, that has been received by one of the receivers (116).

If desired, a similar group of receivers, links, and gate unit may be provided in the home communication system (101) to provide an identical configuration as that described above for the second system (102).

The plurality of member communication units for the home system will typically include one or more fleets or groups. Pursuant to this invention, each such group is assigned an ID for each system that the radios are preregistered with. This preregistration includes information regarding whether the ID represents a local group or roaming group. If the ID relates to a roaming (non-home) group, then the preregistration information should also include information regarding the home system for that group, including control resource information and the group ID for that home system. To accomplish this, the resource controller (107) for the second system (i.e., the non-home system) can be provided with an appropriate data base (131) that retains such information regarding the preregistered IDs.

Operation of the invention may now be described.

A communication unit (123) that belongs to a home system group roams out of the home system (101) and into range of the second system (102). This communication unit (123) then locates the appropriate control resource for this system (this can be done in a number of ways; for example, the communication unit (123) can be previously provided with a list of likely adjacent control resources, or the unit (123) can automatically scan for a control resource when it loses the control resource for its home channel) and transmits (132) a message to the resource controller (107) for the second system to inform the second system of its presence. This message includes the preregistered ID, which the resource controller (107) compares against its database (131) to identify the roaming unit (123) as belonging to a preregistered group from the first system (101).

The resource controller (107) for the second system can then determine that a roamer from the first system (101) has entered the second system (102), and a receiver (116) can be assigned to monitor the control resource of the first system (101).

A different communication unit (121), belonging to the group having the preregistered ID and being situated within range of the first communication system (101), may at any moment initiate a group call by transmitting a request (122) to communicate with its group. This talk request is transmitted on the appropriate control resource for the first communication system (101), and is relayed by the appropriate control resource repeater (104) to the resource controller (103) for the first communication system (101).

The resource controller (103) responds to the request by allocating a communication resource to support the requested communication as is currently done in the prior art. The allocation message from the resource controller includes the group ID for that home system (101) (which ID has been preregistered in the second system's (102) ID database (131)).

This outbound allocation message (124) as sourced by the resource controller (103) and as transmitted by the appropriate control resource repeater (104) will be received by whichever of the receivers (116) in the second communication system (102) is monitoring that particular communication resource of the first system (101). That particular receiver (116) will then provide the signalling information via the appropriate link (117) to the resource controller (107) for the second communication system (102). The second resource controller (107) will recognize the ID as belonging to a roamer located in its system, and the resource controller (107) will assign one of the receivers (116) to monitor the allocated communication resource from the first system (101). The controller (107) will also assign one of its own communication resources to support the communication, and cause an allocation message (126) to be transmitted. This allocation will occur in the usual manner via the control resource of the second system (102), and will be received by the second communication unit (123) and cause the second communication unit (123) to being monitoring the allocated communication resource of the second communication system.

Thereafter, the first communication unit (121) will transmit its messages (for example, voice messages) using communication resource of the first communication system (101). The repeater (104) in the first communication system (101) assigned to support this communication will receive these signals from the first communication unit (121) and repeat them on the allocated communication resource (127). The repeated voice message (127) will be received by the appropriate receiver (116) in the second communication system (102). The resource controller (107) in the second communication system (102) will gate (119) this received voice message to the repeater (108) that has been assigned to support this communication. The assigned repeater (108) will then retransmit (128) the received signal and this retransmission will be received by the second communication unit (123), thereby including the second communication unit (123) in the group call.

Eventually, of course, the roaming unit (123) will leave the second system (102) and return to its home system (101). When this occurs, the roaming unit (123) will lose contact with the second system (102) and subsequently gain contact with the home system (101). Upon detecting the control resource of the home system (102), the roaming unit (123) will again register itself with the home system (101). As part of this process, the home system (101) will transmit a registration acknowledgement to the roaming unit (123) on the appropriate control resource. The second system (102), which is still monitoring the control resource for the home system (101), will detect this acknowledgement, and determine that the roaming unit (123) is no longer within the second system (102). The second system (102) will then deassign the roaming unit (123) and deallocate the receiver (116) that had been previously allocated to monitor the home system (101).

What is claimed is:

1. In a communication system that includes:
    a first communication system that includes a first set of communication resources, and first resource control means for controlling, at least in part, allocation of the first set of communication resources amongst a first plurality of member communication units; and
    a second communication system that includes a second set of communication resources, and second resource control means for controlling, at least in part, allocation of the second set of communication resources amongst a second plurality of member communication units, wherein the first set of communication resources are substantially noncompatible with the second set of communication resources;

a method of establishing communications between:

a first communication unit that is a member of the first plurality of member communication units and that is located within the first communication system; and a second communication unit that is a member of the first plurality of member communication units and that is located within the second communication system;

the method comprising the step of:
A) providing at least some of the communication units in the first plurality of member communication units, including the first and second communication units, with a commonly shared ID;
B) pre-registering the commonly shared ID with the second communication system as a roaming ID;
C) providing the second communication system with receiver means substantially compatible with at least one of the communication resources of the first communication system to allow the second communication system to monitor at least some communications supported by the first communication system;
D) determining, in the second communication system, that the second communication unit is located within the second communication system;
E) monitoring, in the second communication system using the receiver means, at least one communication resource belonging to the first set of communication resources to detect a first system communication intended, at least in part, for communication units that have at least the commonly shared ID;
F) when the first system communication is detected, allocating in the second communication system a communication resource from the second set of communication resources to be used by the second communication unit to receive at least part of the first system communication.

2. In a home communication system that includes a set of communication resources, and resource control means for controlling, at least in part, allocation of the set of communication resources amongst a plurality of member communication units, a method of establishing communications between:

a first communication unit that is a member of the plurality of member communication units and that is located within the home communication system; and a second communication unit that is a member of the plurality of member communication units and that is located within a second communication system, wherein the second communication system includes a second set of communication resources and second resource control means for controlling, at least in part, allocation of the second set of communication resources amongst a second plurality of member communication units, wherein the second set of communication resources are substantially noncompatible with the communication resources of the home system;

the method comprising the steps of:
A) providing at least the first and second communication units with a commonly shared ID;
B) pre-registering the commonly shared ID with the second communication system as a roaming ID;
C) providing the second communication system with receiver means substantially compatible with at least one of the communication resources of the home communication system to allow the second communication system to monitor at least some communications sourced by the home communication system;
D) monitoring, in the second communication system using the receiver means, at least one communication resource belonging to the home communication system to detect a communication intended, at least in part, for communication units that have at least the commonly shared ID;
E) when the communication is detected, allocating in the second communication system a communication resource from the second set of communication resources to be used by the second communication unit to receive at least part of the communication.

* * * * *